(12) United States Patent
Yang et al.

(10) Patent No.: US 10,396,676 B2
(45) Date of Patent: Aug. 27, 2019

(54) BIDIRECTIONAL DC-DC CONVERTER AND CONTROL METHOD THEREFOR

(71) Applicant: ABB Schweiz AG, Baden (CH)

(72) Inventors: Xiaobo Yang, Beijing (CN); Kuenfaat Yuen, Hong Kong (CN); Guoxing Fan, Beijing (CN); Dawei Yao, Beijing (CN); Francisco Canales, Baden-Dättwil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/132,591

(22) Filed: Sep. 17, 2018

(65) Prior Publication Data

US 2019/0020281 A1 Jan. 17, 2019

Related U.S. Application Data

(63) Continuation of application No. PCT/CN2016/076331, filed on Mar. 15, 2016.

(51) Int. Cl.
*H02M 3/335* (2006.01)
*H02M 3/337* (2006.01)
(Continued)

(52) U.S. Cl.
CPC ..... *H02M 3/33584* (2013.01); *H02M 3/3376* (2013.01); *H02M 7/5387* (2013.01);
(Continued)

(58) Field of Classification Search
CPC ........... H02M 3/33584; H02M 3/3376; H02M 7/5387; H02M 2007/4815;
(Continued)

(56) References Cited

U.S. PATENT DOCUMENTS

| 5,438,498 A | * | 8/1995 | Ingemi | ............... | H02M 3/3376 |
| | | | | | 363/132 |
| 6,466,459 B1 | * | 10/2002 | Guerrera | .......... | H02M 3/33569 |
| | | | | | 363/17 |

(Continued)

FOREIGN PATENT DOCUMENTS

| CN | 102064702 A | 5/2011 |
| CN | 103731036 A | 4/2014 |

(Continued)

OTHER PUBLICATIONS

Intellectual Property Office of the P.R. China, International Search Report & Written Opinion issued in corresponding Application No. PCT/CN2016/076331, dated Dec. 19, 2016, 10 pp.

(Continued)

*Primary Examiner* — Kyle J Moody
(74) *Attorney, Agent, or Firm* — J. Bruce Schelkopf; Taft Stettinius & Hollister LLP

(57) ABSTRACT

The invention relates to a bidirectional DC-DC converter with intermediate conversion into AC power, including: a DC-AC conversion circuit using a plurality of MOSFETs; an AC-DC conversion circuit using a plurality of power diodes; a transformer; a pair of switches, one of which being inserted in series between a DC terminal of the DC-AC conversion circuit and the AC-DC conversion circuit and the other of which being inserted in series between another DC terminal of the DC-AC conversion circuit and the AC-DC conversion circuit; and a controller being adapted for turning on the pair of switches such that the plurality of power diodes of the AC-DC conversion circuit are reverse-biased where the AC power is transferred in the forward direction and turning off the pair of switches where the AC power is transferred in the backward direction.

20 Claims, 12 Drawing Sheets

(51) Int. Cl.
*H02M 7/5387* (2007.01)
*H02M 1/00* (2006.01)
*H02M 7/48* (2007.01)

(52) U.S. Cl.
CPC ............... *H02M 2001/0058* (2013.01); *H02M 2007/4815* (2013.01)

(58) Field of Classification Search
CPC . H02M 2001/0058; H02M 2001/0051; H02M 2001/0054
See application file for complete search history.

(56) References Cited

U.S. PATENT DOCUMENTS

| | | | | |
|---|---|---|---|---|
| 6,992,902 B2* | 1/2006 | Jang | ................ | H02M 3/33569 363/132 |
| 7,313,003 B2* | 12/2007 | Nakahori | ................ | H02M 1/32 363/17 |
| 10,044,282 B2* | 8/2018 | Jimichi | ................... | H02M 1/08 |
| 10,086,711 B2* | 10/2018 | Kawamura | ......... | H02M 3/3376 |
| 10,193,460 B2* | 1/2019 | Hayase | ............. | H02M 3/33569 |
| 2007/0216228 A1* | 9/2007 | Johnson, Jr. | ............. | H02J 9/062 307/64 |
| 2008/0170418 A1* | 7/2008 | Nishiyama | ................ | H02M 3/337 363/17 |
| 2009/0059622 A1* | 3/2009 | Shimada | ................ | H02M 1/32 363/17 |
| 2011/0149609 A1 | 6/2011 | Moussaoui et al. | | |
| 2014/0104890 A1 | 4/2014 | Matsubara et al. | | |
| 2014/0146585 A1* | 5/2014 | Tao | ....................... | H02M 7/538 363/41 |
| 2014/0369076 A1 | 12/2014 | Cho | | |
| 2015/0175021 A1 | 6/2015 | Kim et al. | | |
| 2016/0241043 A1* | 8/2016 | Sugimoto | ........... | H02M 7/5387 |
| 2017/0331385 A1* | 11/2017 | Hayase | ................... | H02M 3/28 |
| 2018/0041138 A1* | 2/2018 | Nishikawa | .............. | H02M 7/48 |

FOREIGN PATENT DOCUMENTS

| | | |
|---|---|---|
| CN | 104506039 A | 4/2015 |
| CN | 104734312 A | 6/2015 |
| CN | 204465346 U | 7/2015 |
| JP | 5838859 B2 | 1/2016 |

OTHER PUBLICATIONS

Courtay, "MAST Power Diode and Thyristor Models Including Automatic Parameter Extraction," SABER User Group Meeting, Brighton, United Kingdom, Sep. 1995, 10 pp.

Chen et al., "Fully Soft-switched Bidirectional Resonant DC-DC Converter with a New CLLC Tank," Applied Power Electronics Conference and Exposition (APEC), 2010 25th Annual IEEE, Feb. 21-25, 2010, pp. 1238-1242.

* cited by examiner

BIDIRECTIONAL DC-DC CONVERTER AND CONTROL METHOD THEREFOR

TECHNICAL FIELD

The invention relates to conversion of DC power input into DC power output, and more particularly to bidirectional DC-DC power conversion with immediate conversion into AC power.

BACKGROUND ART

Due to demand for decreasing $CO_2$ emission and improving fuel-efficiency of vehicles, there is a rapid development of electric vehicles (EVs). In general, an EV includes at least one on-board battery for driving an electrical motor and for supplying electric power to electronic devices mounted on the vehicle.

Recently, there has been a demand for bidirectional power transmission of EV charger. In addition to charging the on-board battery by electric power supplied from power grid, it would be desirable to transmit electricity from the on-board battery to various electric appliances, such as power grid, home, or on-board battery of another EV. For example, the on-board battery can behave as an emergency power source to supply power from the EV to electric appliances directly.

A bidirectional DC-DC converter is disclosed in Fully Soft-switched Bidirectional Resonant DC-DC Converter with A New CLLC Tank, Wei Chen et al, Applied Power Electronics Conference and Exposition (APEC), 2010 Twenty-fifth Annual IEEE, 21-25 Feb. 2010. The bidirectional DC-DC converter has two H-bridge converters whose AC terminals are respectively connected with primary winding and secondary winding of a transformer. Either of the H-bridges is actively controlled and the other is uncontrolled only anti-parallel diodes conducting, such that DC power can be transferred in bidirectional manner. As implemented with MOSFETs, soft-switching technique is achievable when the MOSFETs are employed as the input port inverting device for a forward power transmission, since the switching losses and conduction losses of MOSFETs are lower than IGBTs. However, the body diodes of the MOSFETs are used as the output port rectifier for the backward power transmission, the reverse recovery characteristics of body diode of the MOSFET is usually not good enough due to their relatively slow reverse recovery speed and relatively high reverse recovery current or reverse recovery charge, thus bring about relatively high reverse recovery losses. Besides, slower reverser recovery characteristics of the body diodes may worsen the soft-switching operation condition of the DC-DC converter.

BRIEF SUMMARY OF THE INVENTION

It is therefore an objective of the invention to provide a bidirectional DC-DC converter with intermediate conversion into AC power, including: a DC-AC conversion circuit using a plurality of MOSFETs; and an AC-DC conversion circuit using a plurality of power diodes;

a transformer magnetically coupling a first winding and a second winding, wherein the first winding being electrically connected between the DC-AC conversion circuit AC terminals and being electrically connected between the AC-DC conversion circuit AC terminals in an arrangement such that the AC power generated from the intermediate conversion by an operation of the DC-AC conversion is transferred by the transformer in a forward direction from the first winding to the second winding, and the AC-DC conversion circuit converts the AC power transferred in a backward direction from the second winding to the first winding into DC power; a pair of switches, one of which being inserted in series between respective DC terminals of the DC-AC conversion circuit and the AC-DC conversion circuit and the other of which being inserted in series between another respective DC terminals of the DC-AC conversion circuit and the AC-DC conversion circuit; and a controller being adapted for turning on the pair of switches such that the plurality of power diodes of the AC-DC conversion circuit are reverse-biased where the AC power is transferred in the forward direction and turning off the pair of switches where the AC power is transferred in the backward direction.

According to another aspect of present invention, it provides a method for controlling a bidirectional DC-DC converter with intermediate conversion into AC power, which includes a DC-AC conversion circuit using a plurality of MOSFETs, an AC-DC conversion circuit using a plurality of power diodes, and a transformer magnetically coupling a first winding and a second winding, wherein the first winding being electrically connected between the DC-AC conversion circuit AC terminals and being electrically connected between the AC-DC conversion circuit AC terminals in an arrangement such that the AC power generated from the intermediate conversion by an operation of the DC-AC conversion circuit is blocked by the AC-DC conversion circuit but is transferred by the transformer in a forward direction from the first winding to the second winding, and the AC-DC conversion circuit converts the AC power transferred in a backward direction from the second winding to the first winding into DC power, the method including steps of: where the AC power is transferred in the forward direction: electrically connecting respective DC terminals of the DC-AC conversion circuit and the AC-DC conversion circuit; electrically connecting another respective DC terminals of the DC-AC conversion circuit and the AC-DC conversion circuit; reverse-biasing the plurality of power diodes of the AC-DC conversion circuit; and supplying the AC power generated from the intermediate conversion by the DC-AC conversion circuit to the first winding of the transformer; where the AC power is transferred in the backward direction: suppling the AC power from the intermediate conversion by the first winding of the transformer; opening the electrical connection of the respective DC terminals of the DC-AC conversion circuit and the AC-DC conversion circuit; opening the electrical connection of the another respective DC terminals of the DC-AC conversion circuit and the AC-DC conversion circuit; the AC-DC conversion circuit converting the AC power supplied by the first winding into DC power; and blocking the AC power flowing through a body diode of MOSFET of the DC-AC conversion circuit by the opened electrical connections.

By using the technical solute on according to present invention, in the forward direction, input DC power supplied by the first DC power supply is converted into AC power, the transformer regulates the transformation and provides insulation of the AC power, then another AC-DC conversion circuit whose AC terminals are electrically connected with the second winding of the transformer converts the AC power into DC power suppled to the second DC power; in the backward direction, input DC power supplied from the second DC power supply is converted into the AC power by another DC-AC conversion circuit whose AC terminals are electrically connected with the second winding of the transformer, the transformer regulates the transformation and provides insulation of the AC power, then the AC-DC conversion circuit converts the AC power into DC power suppled to the first DC power supply V1.

Preferably, if the power diode of the AC-DC conversion circuit exhibits faster reverse recovery characteristics and relatively higher forward-bias voltage than a body diode of the MOSFET of the DC-AC conversion circuit, the opened pair of switches cut off the reverse electrical power which otherwise would flow from the first winding through the body diodes of the MOSFETs to the first DC power source V1 bypassing the power diodes of the AC-DC conversion circuit. This enables the bidirectional DC-DC converter according to the embodiment of present invention to achieve bidirectional power transmission with the power diode of the AC-DC conversion circuit exhibiting faster reverse recovery characteristics than a body diode of the MOSFET of the DC-AC conversion circuit, such as faster reverse recovery characteristics diodes or SiC diodes.

Preferably, one end of the first winding is electrically connected with both of a cathode of the body diode of one of the plurality of MOSFETs of the DC-AC conversion circuit and a cathode of one of the plurality of power diodes of the AC-DC conversion circuit; and the other end of the first winding is electrically connected with both of an anode of the body diode of another of the plurality of MOSFETs of the DC-AC conversion circuit and an anode of another of the plurality of power diodes of the AC-DC conversion circuit. The DC-AC conversion circuit and the AC-DC conversion circuit at the first winding side both employ circuit configuration of full-bridge. Thus, the rating voltage for the power switches of either of them could be lower. In particular, the DC-AC conversion circuit can include a first switching leg comprising two of the MOSFETs connected in series; a second switching leg comprising another two of the MOSFETs connected in series and being connected with the first switching leg in parallel; both ends of the first switching are the DC terminals of the DC-AC conversion circuit; and the series connection point of the first leg and the series connection point of the second leg are the AC terminals of the DC-AC conversion circuit. In particular, the AC-DC conversion circuit includes: a first diode leg comprising two of the power diodes connected in series; a second diode leg comprising another two of the power diodes connected in series and being connected with the first diode leg in parallel; both ends of the first diode leg are the DC terminals of the AC-DC conversion circuit; and the series connection point of the first diode leg and the series connection point of the second diode leg are the AC terminals of the AC-DC conversion circuit.

Preferably, the switch includes an auxiliary MOSFET; and a body diode of the auxiliary MOSFET of the switch is connected in anti-series with the body diode of the MOSFET of the DC-AC conversion circuit. Thus, the conductive losses of the switch is relatively low accordingly.

Preferably, the DC-AC conversion circuit is configured of multilevel full bridge topology or multilevel half bridge topology. Thus, the rating voltage for the power switches of DC-AC conversion circuit can be decreased.

Preferably, the DC-AC conversion circuit includes: a switching leg comprising two of the MOSFETs connected in series; a capacitor leg comprising a pair of capacitors connected in series and being connected with the switching leg in parallel; wherein: both ends of the switching leg are the DC terminals of the DC-AC conversion circuit; the series connection point of the switching leg and the series connection point of the capacitor leg are the AC terminals of the DC-AC conversion circuit. The AC-DC conversion circuit includes: a diode leg comprising two of the power diodes connected in series; and the capacitor leg being connected with the diode leg in parallel; wherein: both ends of the diode leg are the DC terminals of the AC-DC conversion circuit; and the series connection point of the diode leg and the series connection point of the capacitor leg are the AC terminals of the AC-DC conversion circuit. By implementing the DC-AC conversion circuit as a half-bridge configuration, the number of the power switches can be reduced and thus the cost of the DC-DC converter can be lowered.

Preferably, a capacitive element or an inductive element can be used to realize soft-switching of the MOSFETs.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the Figures.

PREFERRED EMBODIMENTS OF THE INVENTION

Embodiments of the present invention will now be described in detail with reference to the accompanying drawings.

Figure 1:
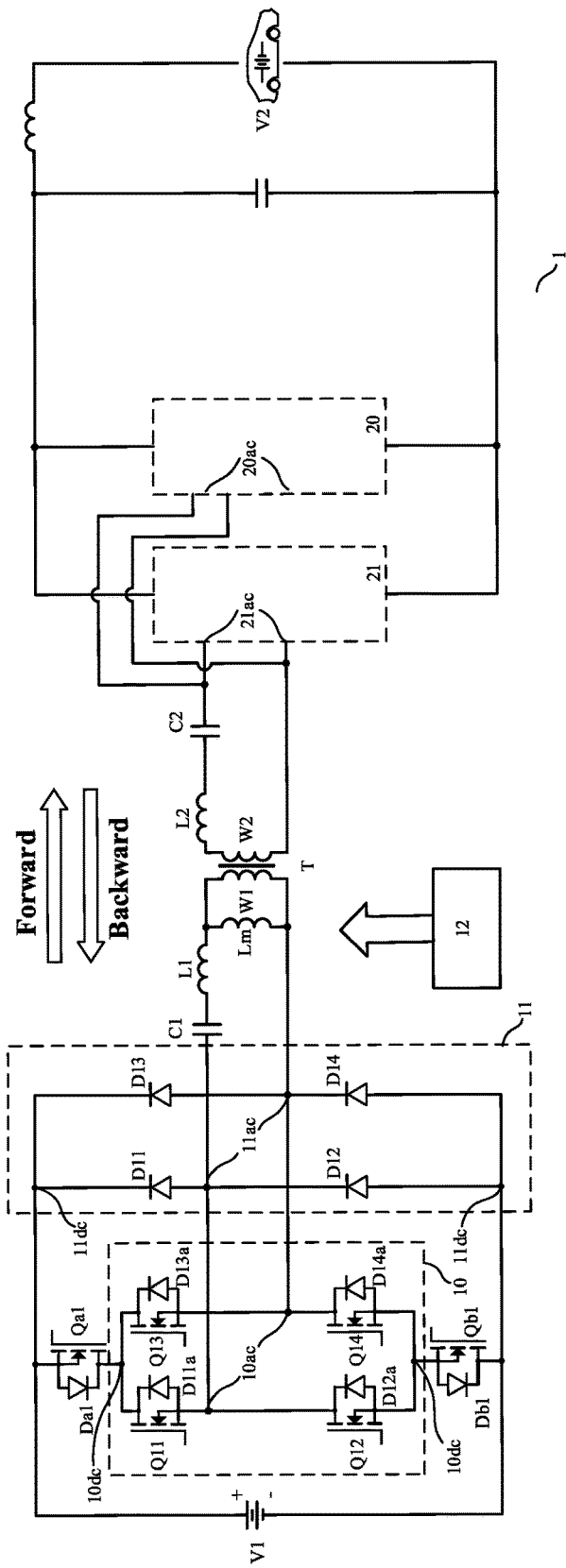
FIG. 1 is a schematic circuit diagram of a bidirectional DC-DC converter with intermediate conversion into AC power according to a first embodiment of present invention.
Figure 2A:
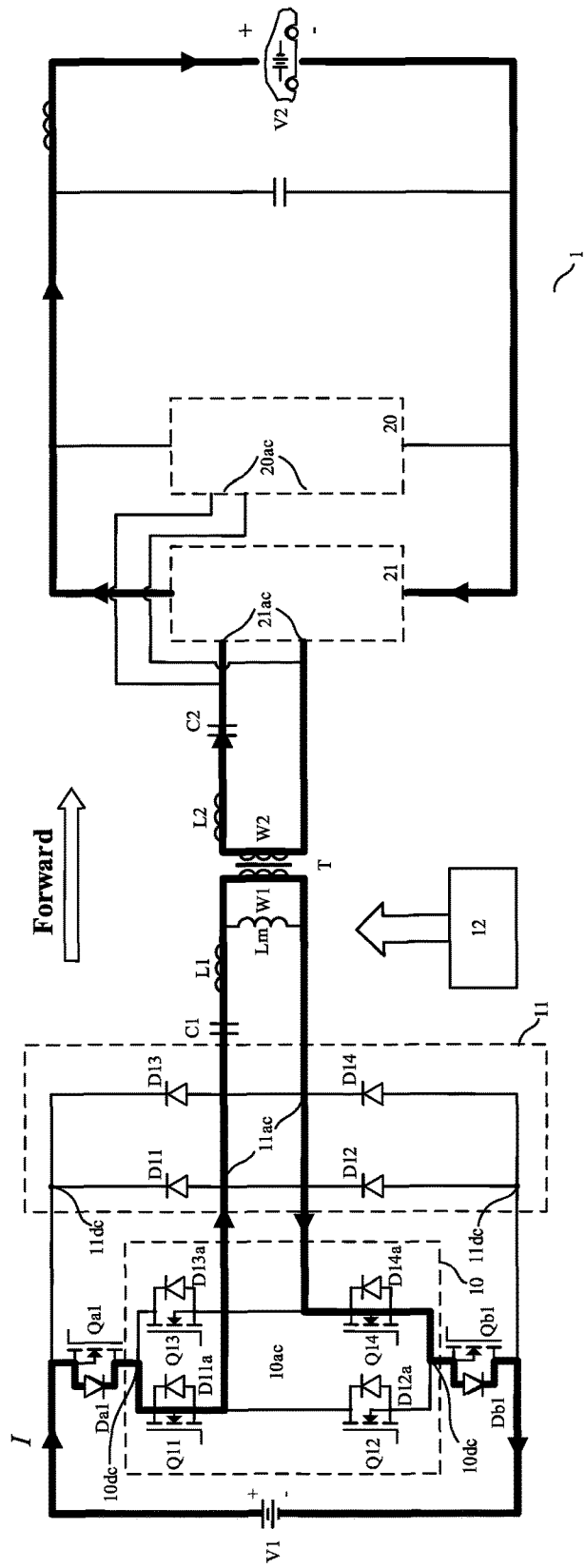
FIGS. 2A to 2D respectively show circuit diagrams stages F1 to F4 illustrating the switching operation performed according to the first embodiment in forward power transmission.
Figure 2B:
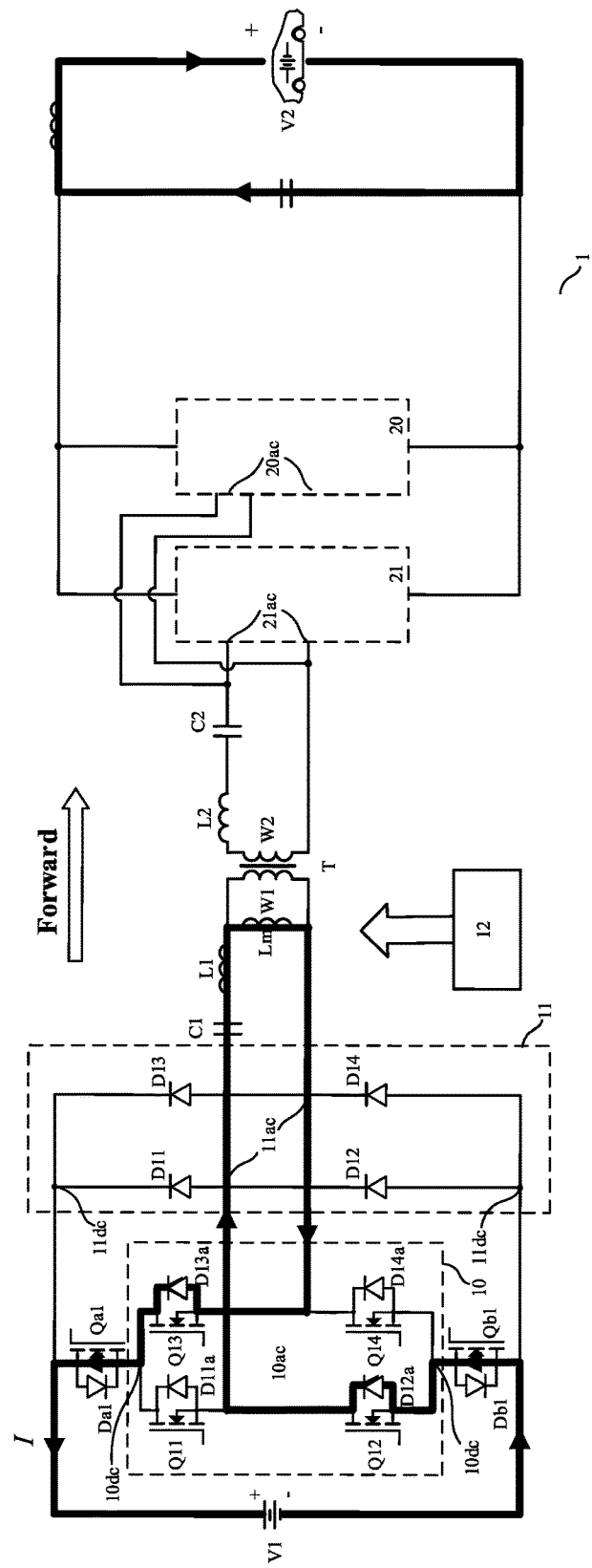
Figure 2C:
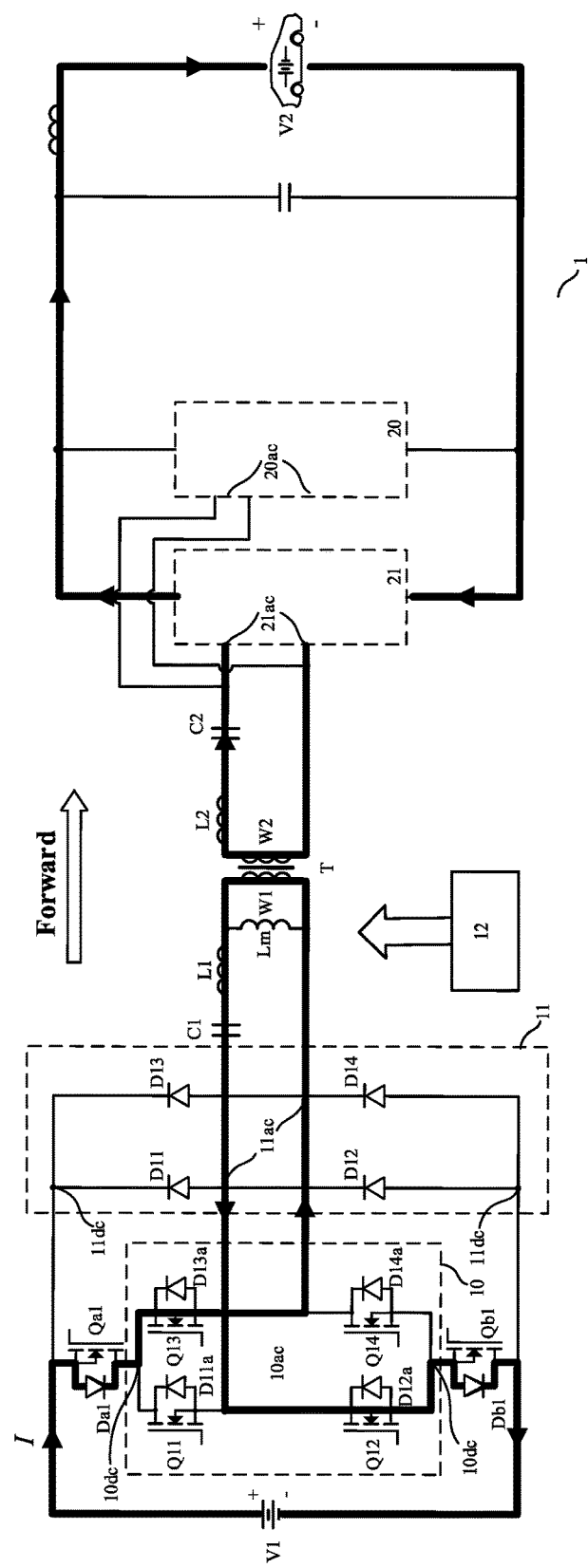
Figure 2D:
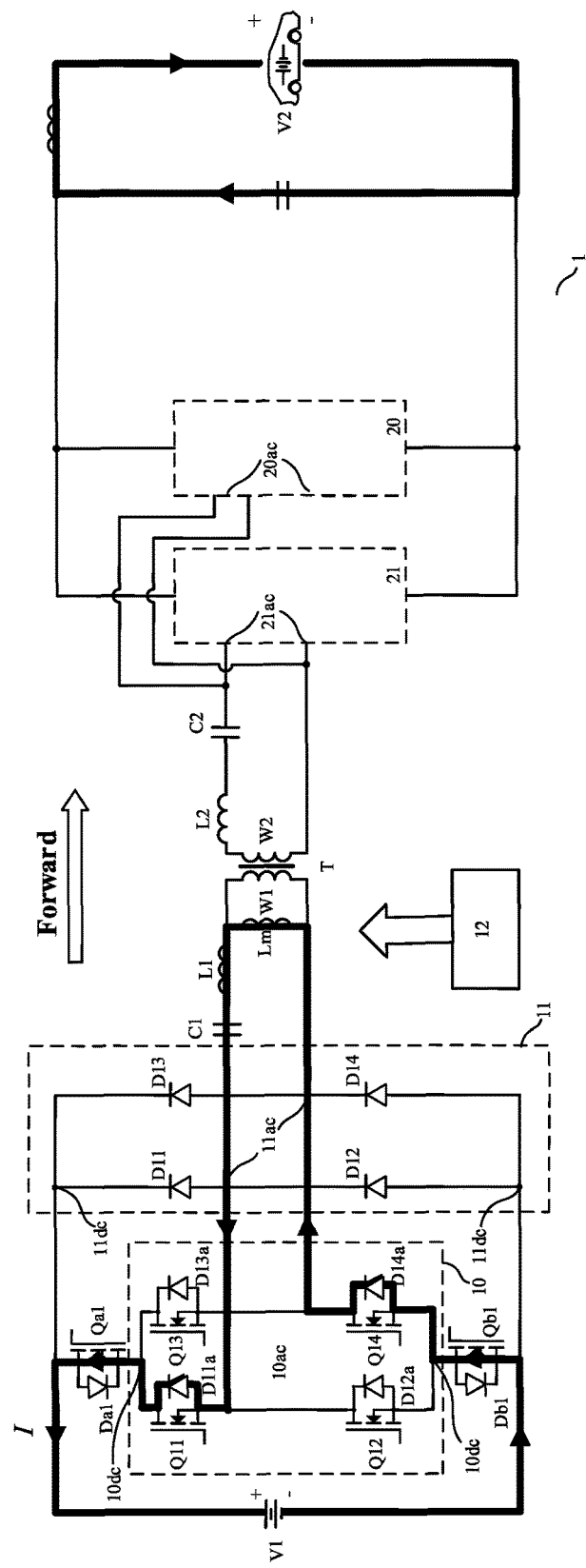

FIG. 1 is a schematic circuit diagram of a bidirectional DC-DC converter with intermediate conversion into AC power according to a first embodiment of present invention. A first DC power supply V1 and a second DC power supply V2 can be electrically connected to the opposite ends of the bidirectional DC-DC converter 1 to transfer electric power between the first DC power supply V1 and the second DC power supply V2. For example, the first DC power supply V1 can be generated from power grid, photovoltaic battery, home power supply, on-board battery of a first EV, and the like, and the second DC power supply V2 can be provided by on-board battery of a second EV; as an alternative, the first DC power supply V1 can be generated from an on-board battery of a first EV and the second DC power supply V2 is powered by power grid, photovoltaic battery, home power supply, on-board battery of a second EV, and the like, as well. The skilled person should understand that electric power can thus flow in a forward direction from the first DC power supply V1 to the second DC power supply V2 through the an intermediate conversion into AC power or vice versa in a backward direction.

As shown FIG. 1, the bidirectional DC-DC converter 1 with intermediate conversion into AC power includes a DC-AC conversion circuit 10 using a plurality of MOSFETs, an AC-DC conversion circuit 11 using a plurality of power diodes, and a transformer T magnetically coupling a first winding W1 and a second winding W2, wherein the first winding W1 is electrically connected between AC terminals 10ac of the DC-AC conversion circuit 10 and is electrically connected between AC terminals 11ac of the AC-DC conversion circuit 11. The AC power generated from the intermediate conversion by an operation of the DC-AC conversion circuit 10 can be transferred by the transformer T in a forward direction from the first winding W1 to the second winding W2, and the AC-DC conversion circuit 11 can convert the AC power transferred in a backward direction from the second winding W2 to the first winding W1 into DC power. By have such arrangement, in the forward direction, input DC power supplied by the first DC power supply V1 is converted into AC power, the transformer T regulates the transformation and provides insulation of the AC power, then another AC-DC conversion circuit 20 whose AC terminals 20ac are electrically connected with the second winding W2 of the transformer T converts the AC power into DC power suppled to the second DC power V2; in the backward direction, input DC power supplied from the second DC power supply V2 is converted into the AC power by another DC-AC conversion circuit 21 whose AC terminals 21ac are electrically connected with the second winding W2 of the transformer T, the transformer T regulates the transformation and provides insulation of the AC power, then the AC-DC conversion circuit 11 converts the AC power into DC power suppled to the first DC power supply V1.

As shown FIG. 1, the bidirectional DC-DC converter 1 further includes a pair of switches Qa1, Qb1, one of which Qa1 is inserted in series between respective DC terminals 10dc, 11dc of the DC-AC conversion circuit 10 and the AC-DC conversion circuit 11 and the other of which Qb1 is inserted in series between another respective DC terminals 10dc, 11dc of the DC-AC conversion circuit 10 and the AC-DC conversion circuit 11. Where both of the switches Qa1, Qb1 are opened, the DC-AC conversion circuit 10 is disconnected from the AC-DC conversion circuit 11. Therefore, when the electric power flows in the backward direction where the AC-DC conversion circuit operates rectifying the AC power supplied from the first winding W1 of the transformer T, the current flowing through body diodes of the MOSFETs of the DC-AC conversion circuit 10 is blocked.

As shown FIG. 1, the bidirectional DC-DC converter 1 further includes a controller 12 that controls to switch the MOSFETs of the DC-AC conversion circuit 10 and the switches Qa1, Qb1 between ON and OFF states. The controller 12 is configured for turning on the pair of switches Qa1, Qb1 such that the plurality of power diodes of the AC-DC conversion circuit 11 are reverse-biased where the AC power is transferred in the forward direction and turning off the pair of switches Qa1, Qb1 where the AC power is transferred in the backward direction. An operation that the bidirectional DC-DC converter 1 according to the first embodiment performs for forward power transmission will now be described. The controller 12 maintains the switches Qa1, Qb1 in the ON state and applies an AC power to the first winding W1 by allowing the DC-AC conversion circuit 10 to perform a switching operation. The AC-DC conversion circuit 21 rectifies a voltage induced across the second winding W2 and supplies electrical power to the second DC power supply V2.

As described above, the switches Qa1, Qb1 is maintained in the ON state during forward power transmission. As this forms a short circuit across the respective DC terminals 10dc, 11dc of the DC-AC conversion circuit 10 and the AC-DC conversion circuit 11, and a short circuit across another respective DC terminals 10dc, 11dc of the DC-AC conversion circuit 10 and the AC-DC conversion circuit 11, the DC-AC conversion circuit 10 operates to lower the voltage level at respective AC terminals 10ac, 11ac of the DC-AC conversion circuit 10 and the AC-DC conversion circuit 11 and increase the voltage level at another respective AC terminals 10ac, 11ac of the DC-AC conversion circuit 10 and the AC-DC conversion circuit 11, the power diodes of the AC-DC conversion circuit 11 are reverse-biased. The resulting circuit configuration at the first winding W1 side is equivalent to a conventional AC-DC conversion circuit with its output electrically connected with the first winding W1 of the transformer T.

Next, an operation that the bidirectional DC-DC converter according to the first embodiment performs for backward power transmission will now be described. The controller 12 maintains the switches Qa1, Qb1 in the OFF state and the AC-DC conversion circuit 11 rectifies a voltage induced across the winding W1 from the AC power applied to the second winding W2 and supplies electrical power to the DC power supply V1. The AC power applied to the second winding W2 of the transformer T is provided by the DC-AC conversion circuit 20 at the second winding W2 side.

As described above, when backward power transmission occurs, the AC-DC conversion circuit 11 at the first winding side functions as a rectifier circuit with the switches Qa1, Qb1 maintained in the OFF state. As shown FIG. 1, for example, the DC-AC conversion circuit 10 is configured with full-bridge topology. The DC-AC conversion circuit 10 includes: a first switching leg comprising two of the MOSFETs Q11, Q12 connected in series, and a second switching leg comprising another two of the MOSFETs Q13, Q14 connected in series and being connected with the first switching leg in parallel. Both ends of the first switching are the DC terminals 10dc of the DC-AC conversion circuit 10, and the series connection point of the first leg and the series connection point of the second leg are the AC terminals 10ac of the DC-AC conversion circuit 10. One end of the first winding W1 is electrically connected with both of an anode of the body diode D11a of one of the plurality of MOSFETs Q11 of the DC-AC conversion circuit 10 and anode of one of the plurality of power diodes D11 of the AC-DC conversion circuit 11, and the other end of the first winding W1 is electrically connected with both of a cathode of the body diode D14a of another of the plurality of MOSFETs Q14 of the DC-AC conversion circuit 10 and a cathode of another of the plurality of power diodes D14 of the AC-DC conversion circuit 11.

Also as an example, the AC-DC conversion circuit 11 includes: a first diode leg comprising two of the power diodes D11, D12 connected in series, and a second diode leg comprising another two of the power diodes D13, D14 connected in series and being connected with the first diode leg in parallel. Both ends of the first diode leg are the DC terminals 11dc of the AC-DC conversion circuit 11, and the series connection point of the first diode leg and the series connection point of the second diode leg are the AC terminals 11ac of the AC-DC conversion circuit 11. The skilled person shall understand that each MOSFET Q11, Q12, Q13, Q14 has respective body diode D11a, D12a, D13a, D14a.

In this instance, if a body diode D11a, D12a, D13a, D14a of a MOSFET Q11, Q12, Q13, Q14 constituting the DC-AC conversion circuit 10 exhibit relatively slow reverse recovery characteristics and relatively low forward-bias voltage as compared with the power diodes D11, D12, D13, D14 of the AC-DC conversion circuit 11, the opened pair of switches Qa1, Qb1 cut off the reverse electrical power which otherwise would flow from the first winding W1 through the body diodes D11a, D12a, D13a, D14a of the MOSFETs Q11, Q12, Q13, Q14 to the first DC power source V1 bypassing the power diodes D11, D12, D13, D14 of the AC-DC conversion circuit 11. This enables the bidirectional DC-DC converter according to the embodiment of present invention to achieve bidirectional power transmission with the power diode of the AC-DC conversion circuit 11 exhibiting faster reverse recovery characteristics than a body diode of the MOSFET of the DC-AC conversion circuit 10, such as faster reverse recovery characteristics diodes or SiC diodes.

Besides, the voltage drop across the respective DC terminals of the AC-DC conversion circuit and the DC-AC conversion circuit at the first winding side is relatively low, the switch Qa1, Qb1 may use low voltage auxiliary MOSFET and the conductive losses is relatively low accordingly. A body diode Da1, Db1 of the auxiliary MOSFET of the switch Qa1, Qb1 is connected in anti-series with the body diode D11a, D12a, D13a, D14a of the MOSFET Q11, Q12, Q13, Q14 of the DC-AC conversion circuit 10, such that during backward power transmission, the body diodes Da1, Db1 of the auxiliary MOSFET of the switches Qa1, Qb1 are reversed-biased and the conducting path of the body diode D11a, D12a, D13a, D14a of the MOSFET Q11, Q12, Q13, Q14 of the DC-AC conversion circuit 10 is blocked. In consideration that the switches Qa1, Qb1 would operate at normal ON or normal OFF state, whose states change between ON and OFF only when a switch is made to initiate forward power transmission or backward power transmission, their switching frequency is much lower than those for the power switches of either the AC-DC conversion circuit or the DC-AC conversion circuit, and their switching losses are negligible. The bidirectional DC-DC converter according to the embodiment of present invention can use a mechanical switch such as an electromagnetic relay.

The above-mentioned problem can also be solved by using an IGBT with an antiparallel diode as a switching/rectifying device for the AC-DC conversion circuit 10 instead of using the above-described embodiment. However, the IGBT suffers an increase in the conductive/switching losses and a decrease in the efficiency of forward power transmission because it exhibits slower switching characteristics and higher conductive losses than MOSFET. Further, if a switching frequency is decreased to reduce the switching loss, it is necessary to increase the sizes of some passive components such has the transformer T and smoothing capacitors. This will result in an increase of the cubic volume of the bidirectional DC-DC converter.

Another method of solving the above-mentioned problem without using the present invention is to add a parallel connected fast recovery diode to the body diode and an auxiliary diode to block the current flow through the body diode. However, the use of this method will increase the cost and PCB layout complexity due to an increase in the number of parts.

FIGS. 2A to 2D respectively show circuit diagrams stages F1 to F4 illustrating the switching operation performed according to the first embodiment in forward power transmission. At the side of the first widning W1, the MOSFETs Q11, Q12, Q13 and Q14 of the DC-AC conversion circuit 10 operate normally as a full bridge converter, the power diodes D11, D12, D13 and D14 of the AC-DC conversion circuit 11 are reverse biased, and the auxiliary MSOFET Qa1, Qb1 maintains ON state. It is assumed that the circuit has come into steady state.

Stage F1:

In stage F1, the auxiliary MSOFET Qa1, Qb1 are ON and the MOSFETs Q11, Q14 are ON, electrically connecting respective DC terminals 10dc, 11dc of the DC-AC conversion circuit 10 and the AC-DC conversion circuit 11 and electrically connecting another respective DC terminals 10dc, 11dc of the DC-AC conversion circuit 10 and the AC-DC conversion circuit 11. The DC power supply V1 is applied to the first winding W1 through the the auxiliary MSOFET Qa1, Qb1 and the MOSFETs Q11, Q14, and the power diodes D11, D12, D13 and D14 of the AC-DC conversion circuit 11 are reverse biased, and the charging current I increases flowing through through the auxiliary MSOFET Qa1, Qb1 and the MOSFETs Q11, Q14.

The controlled switching devices of the DC-AC conversion circuit 20 are OFF so that the AC power induced across the second winding W2 is applied to the second DC power supply V2 through the AC-DC conversion circuit 21. Consequently, energy is supplied to the second DC power supply V2.

Stage F2:

When the the MOSFETs Q11, Q14 are turned off, the current flowing in the MOSFET Q11 and Q14 charge the respective output capacitor of Q11 and Q14 and discharge the respective output capacitor of Q12 and Q13, and then commute to the body diode D12a of the MOSFET Q12, and the body diode D13a of the MOSFET Q13.

Stage F3:

In stage F3, the auxiliary MSOFET Qa1, Qb1 are ON and the MOSFETs Q12, Q13 are ON. The DC power supply V1 is applied to the first widning W1 through the the auxiliary MSOFET Qa1, Qb1 and the MOSFETs Q12, Q13, and the power diodes D11, D12, D13 and D14 of the AC-DC conversion circuit 11 keep reverse biased, and the The charging current I decrease to zero and then reversely increases flowing through the auxiliary MSOFET Qa1, Qb1 and the MOSFETs Q12, Q13.

The controlled switching devices of the DC-AC conversion circuit 20 are OFF so that the AC power induced across the second winding W2 is applied to the second DC power supply V2 through the AC-DC conversion circuit 21. Consequently, energy is supplied to the second DC power supply V2.

Stage F4:

When the the MOSFETs Q12, Q13 are turned off, the current flowing in the MOSFET Q12 and Q13 charge the respective output capacitor of Q12 and Q13 and discharge the respective output capacitor of Q11 and Q14, and then commute to the body diode D11a of the MOSFET Q11, and the body diode D14a of the MOSFET Q14.

After stage F4, the circuit will start a new operation and repeat from Stage F1.

As can be seen from the operation of the bidirectional DC-DC converter in the forward power transmission, the voltage level across the AC terminals 11ac of the AC-DC conversion circuit 11 is clamped to the voltage level across the AC terminals 10ac of the DC-AC conversion circuit 10, which applies the reverse-biasing of the power diodes D11 to D14 of the AC-DC conversion circuit 11. The resulting circuit configuration is equivalent to a conventional inverter controlled to convert DC power into AC power.

Figure 3A:
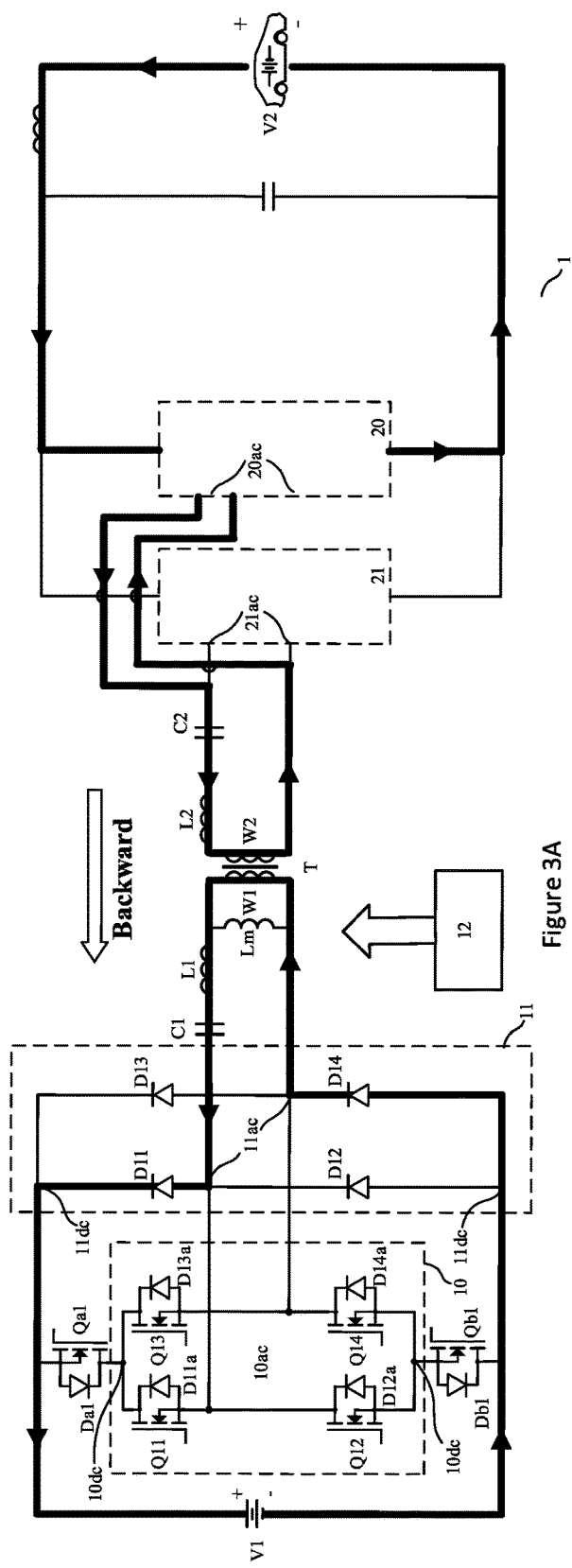
FIGS. 3A to 3B respectively show circuit diagrams stages B1 to B2 illustrating the switching operation performed according to the first embodiment in backward power transmission.
Figure 3B:
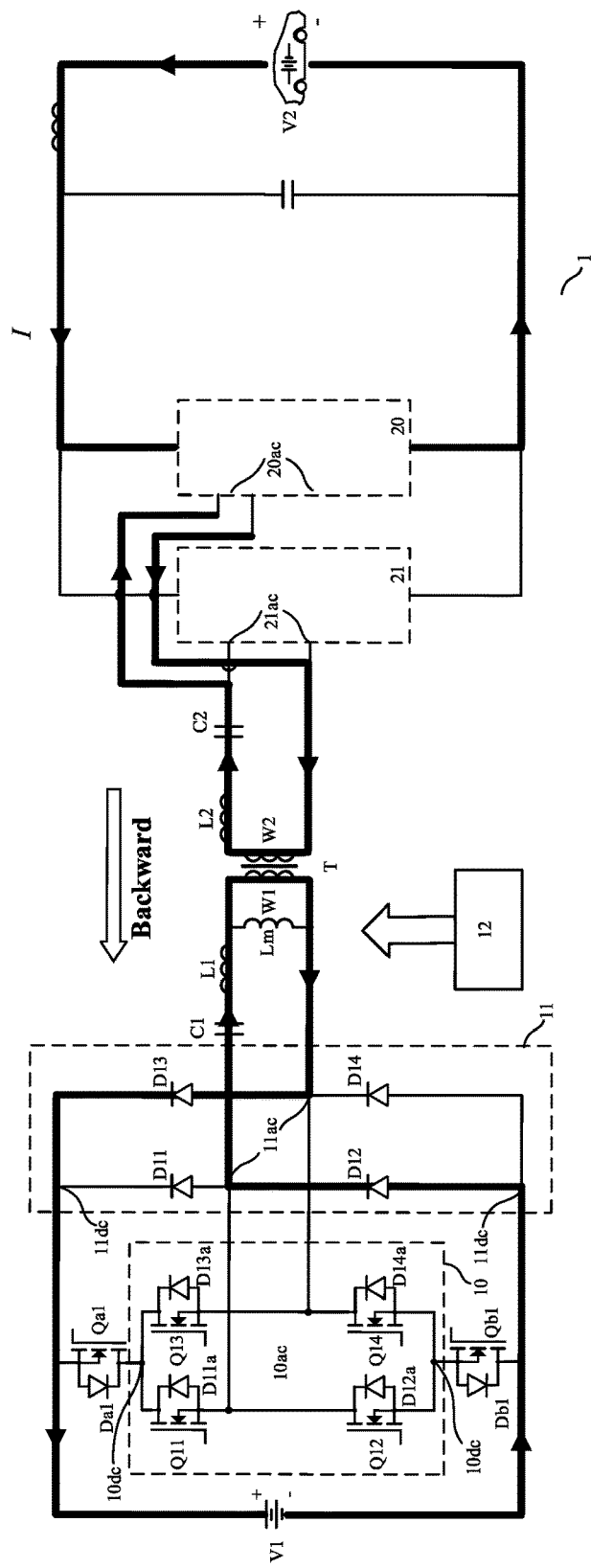

FIGS. 3A to 3B respectively show circuit diagrams stages B1 to B2 illustrating the switching operation performed according to the first embodiment in backward power transmission. At the side of the first widning W1, the MOSFETs Q11, Q12, Q13 and Q14 of the DC-AC conversion circuit 10 are OFF, the power diodes D11, D12, D13 and D14 of the AC-DC conversion circuit 11 operate normally as a diode rectifier, and the auxiliary MSOFET Qa1, Qb1 maintains OFF state, the electrical connection of the respective DC terminals 10dc, 11dc of the DC-AC conversion circuit 10 and the AC-DC conversion circuit 11 being disconnected, and the electrical connection of the another respective DC terminals 10dc, 11dc of the DC-AC conversion circuit 10 and the AC-DC conversion circuit 11 being disconnected.

Stage B1:

AC power is supplied from the intermediate conversion by the first winding W1 of the transformer T. The AC power is induced across the first winding W1 by applying the second DC power supply V2 to the second winding W2 of the transformer T by the operation of the DC-AC conversion circuit 20. The charging current I flowing through the power diodes D11, D14 of the AC-DC conversion circuit 11, but is blocked by the reverse-biased body diodes Da1, Db1 of the auxiliary MSOFET Qa1, Qb1. Consequently, energy is supplied to the first DC power supply V1.

Stage B2:

When phase-commutation occurs in the DC-AC conversion circuit 20, the charging current I reverse its direction with zero-crossing. The charging current I increases flowing through the power diodes D12, D13 of the AC-DC conversion circuit 11, but is still blocked by the reverse-biased body diodes Da1, Db1 of the auxiliary MSOFET Qa1, Qb1. Consequently, energy is supplied to the first DC power supply V1.

After stage B2, the circuit will start a new operation and repeat from Stage B1.

As can be seen from the operation of the bidirectional DC-DC converter in the backward power transmission, the opened switches Qa1, Qb1 cut off current path leading from the first winding W1 of the transformer T through body diodes D11a, D12a, D13a, D14a of the MOSFETs Q11, Q12, Q13, Q14. Therefore, even if they have a lower forward-biased voltage than the power diodes D11, D12, D13, D14 of the AC-DC conversion circuit 11, the former would not bypass the latter and the performance of the bidirectional DC-DC converter would not be negatively affected by the relatively slow reverse recovery characteristics of the body diode of the MOSFETs.

Figure 4:
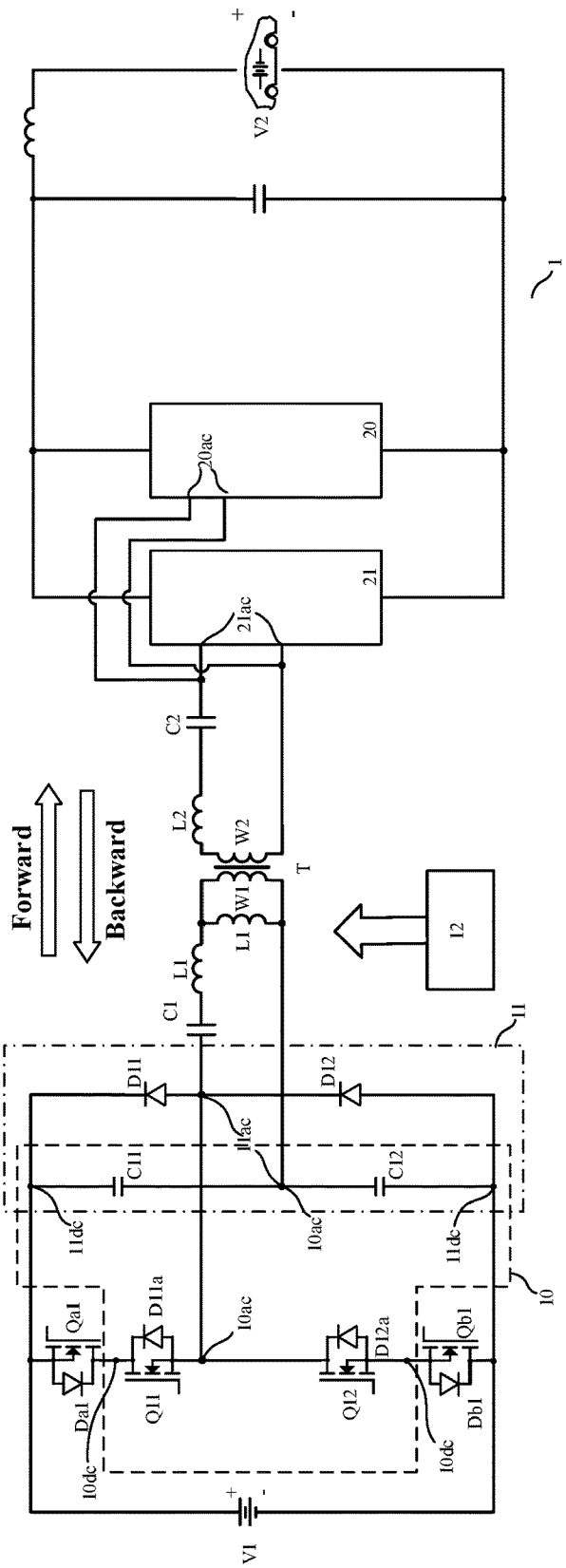
FIG. 4 is a schematic circuit diagram of a bidirectional DC-DC converter with intermediate conversion into AC power according to a second embodiment of present invention.

FIG. 4 is a schematic circuit diagram of a bidirectional DC-DC converter with intermediate conversion into AC power according to a second embodiment of present invention. The bidirectional DC-DC converter according to the second embodiment differs from the first embodiment in the circuit configuration of the DC-AC conversion circuit and the AC-DC conversion circuit at the side of the first winding W1 of the transformer T.

As shown in FIG. 4, the DC-AC conversion circuit 10 is of half-bridge configuration, including a switching leg comprising two of the MOSFETs Q11, Q12 connected in series, a capacitor leg comprising a pair of capacitors C11, C12 connected in series and being connected with the switching leg in parallel. Both ends of the switching leg are the DC terminals 10dc of the DC-AC conversion circuit 10, and the series connection point of the switching leg and the series connection point of the capacitor leg are the AC terminals 10ac of the DC-AC conversion circuit 10. In the forward power transmission, the pair of switches Qa1, Qb1 are ON. The pair of capacitors C11, C12 are resued in the AC-DC conversion circuit 11 configured in half-bridge, as well. As described hereafter, the capacitors C11, C12 participate in the DC-AC conversion when the forward power transmission occurs, and participate in the AC-DC conversion when the backward power transmission occurs. As shown in FIG. 4, the AC-DC conversion circuit 11 includes: a diode leg comprising two of the power diodes D11, D12 connected in series and the capacitor leg C11, C12 being connected with the diode leg in parallel. Both ends of the diode leg are the DC terminals 11dc of the AC-DC conversion circuit 11, and the series connection point of the diode leg and the series connection point of the capacitor leg are the AC terminals 11ac of the AC-DC conversion circuit 11. One of the AC terminals 10ac of the DC-AC conversion circuit 10 and one of the AC terminals 11ac of the AC-DC conversion circuit 11 share the same point. As for the pair of switches Qa1, Qb1, one of them Qa1 is inserted in series between respective DC terminals 10dc, 11dc of the DC-AC conversion circuit 10 and the AC-DC conversion circuit 11 and the other of them Qb1 is inserted in series between another respective DC terminals 10dc, 11dc of the DC-AC conversion circuit 10 and the AC-DC conversion circuit 11.

In the forward power transmission, switches Qa1, Qb1 are ON. Where MOSFETs Q11 is ON and MOSFET Q12 is OFF, the voltage of the first DC power supply V1 minus the voltage of the capacitor C12 is applied across the first winding W1; where MOSFETs Q11 is OFF and MOSFET Q12 is ON, the voltage of the capacitor C12 is reversely applied across the first winding W1. The conducting of either of the MOSFETs Q11, Q12 of the DC-AC conversion circuit 10 makes both of the power diodes D11, D12 of the AC-DC conversion circuit 11 reverse-biased. The AC power induced across the second winding W2 of the transformer T is converted into DC power by the AC-DC conversion circuit 21 supplied to the second DC power V2.

In the backward power transmission, switches Qa1, Qb1 are OFF. This cuts off current path leading from the first winding W1 of the transformer T through body diodes D11a, D12a of the MOSFETs Q11, Q12. Therefore, even if they have a lower forward-biased voltage than the power diodes D11, D12 of the AC-DC conversion circuit 11, the former would not bypass the latter and the performance of the bidirectional DC-DC converter would not be negatively affected by the relatively slow reverse recovery characteristics of the body diode of the MOSFETs. The resulting circuit configuration is equivalent to half-bridge AC-DC converter converting the AC power induced across the first winding W1 of the transformer into DC power charging the first DC power supply V1. In particular, with the change of the polarity of the voltage across the first winding, the induced voltage across the first winding W1 minus the voltage of the capacitor C12 and the voltage of C11 plus the voltage of C12 are alternatively applied on the first DC power supply V1.

Figure 5:
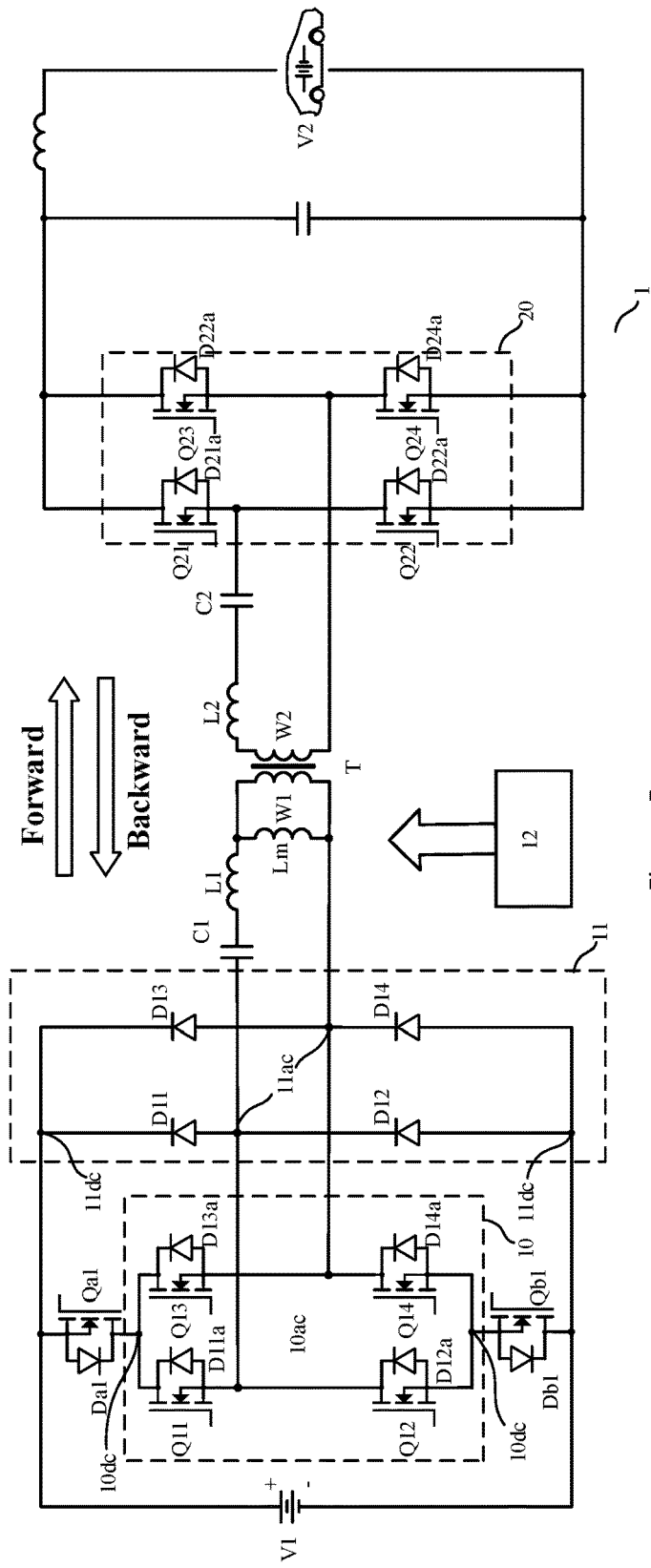
FIG. 5 is a schematic circuit diagram of a bidirectional DC-DC converter with intermediate conversion into AC power according to a third embodiment of present invention.

As described above, the bidirectional DC-DC converter according to the embodiment of present invention is specified with examples explaining circuit topology at the side of the first winding W1 and how the bidirectional transmission of DC power based on that. FIG. 5 is a schematic circuit diagram of a bidirectional DC-DC converter with intermediate conversion into AC power according to a third embodiment of present invention. As shown in FIG. 5, the circuit topology at the side of the second winding W2 can be implemented according to that of conventional bidirectional DC-DC converter, for example a full-bridge using MOSFETs as described in the Wei Chen et al's paper, where when the forward transmission occurs, the resulting circuit configuration is equivalent to a uncontrolled AC-DC conversion circuit using body diodes of the MOSFETs, and when the backward transmission occurs, the resulting circuit configuration is equivalent to a controlled DC-AC conversion circuit. The DC-AC conversion circuit 20 is configured in full-bridge using MOSFETs Q21, Q22, Q23, Q24. Each of them has body diode D21a, D22a, D23a, D24a.

Figure 6:
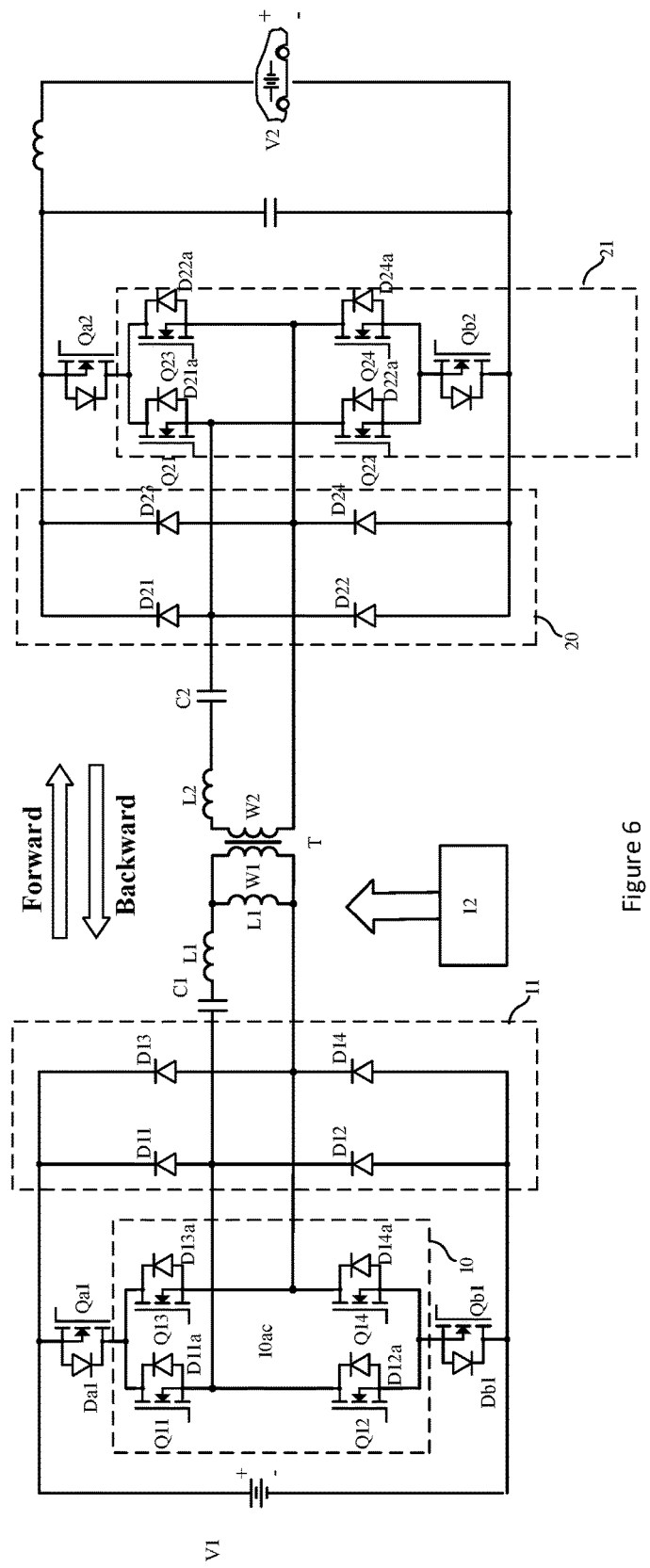
FIG. 6 is a schematic circuit diagram of a bidirectional DC-DC converter with intermediate conversion into AC power according to a fourth embodiment of present invention.

As an alternative, the circuit topology at the side of the second winding W2 can use the circuit configuration similar to that at the side of the first winding W1 according to an embodiment of present invention. FIG. 6 is a schematic circuit diagram of a bidirectional DC-DC converter with intermediate conversion into AC power according to a fourth embodiment of present invention. As shown in FIG. 6, the DC-AC conversion circuit 20 can be designed in a circuit configuration similar to the DC-AC conversion circuit 10, including MOSFETs Q21, Q22, Q23, Q24 each having body diode D21a, D22a, D23a, D24a. The AC-DC conversion circuit 21 can be designed in a circuit configuration similar to the AC-DC conversion circuit 11, including power diodes D21, D22, D23, D24. Another pair of switches Qa2, Qb2 are arranged with respect to the DC-AC conversion circuit 20 and the AC-DC conversion circuit 21 in an electrical connection relationship symmetrical to that between the switch Qa1, Qb1 and the DC-AC conversion circuit 10 and the AC-DC conversion circuit 11 according to an embodiment of present invention. Therefore, the switching operation at the side of the second winding W2 can be performed in the symmetrical manner as described in the prior art or symmetrical to operation at the side of the first winding W1 according to the embodiment of present invention.

As an alternative to the embodiment of present invention, the DC-AC conversion circuit 10 can be configured of multilevel full bridge topology or multilevel half bridge topology. The resulting circuit configuration is equivalent to the circuit configuration described in paper Novel Modulation Method of a Three-Level Isolated Full-Bridge LLC Resonant DC-DC Converter for Wide-output Voltage Application, Francisco Canales et al, 15th International Power Electronics and Motion Control Conference, EPE-PEMC 2012 ECC Europe, Novi Sad, Serbia and A Single Stage Three Level Resonant LLC AC/DC Converter, Mohammed S. Agamy et al, IEEE Applied Power Electronics Conference & Exposition, 2006.

Figure 7:
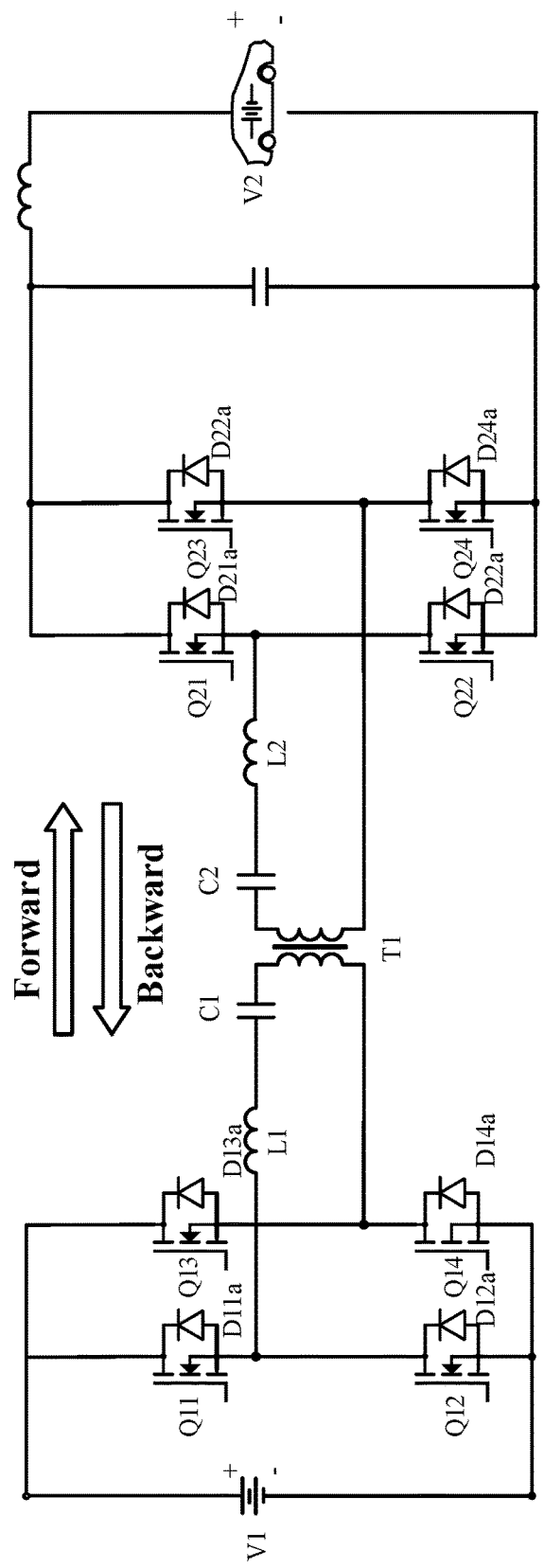
FIG. 7 is a schematic circuit diagram of a bidirectional DC-DC converter as the benchmark solution.

Preferably, the bidirectional DC-DC converter according to the embodiment of present invention further includes a capacitive element C1, C2, an inductive element L1, L2, or an inductive element Lm to realize soft-switching of the MOSFETs Power losses are calculated and compared between benchmark solution and that according to the fourth embodiment of present invention, both of which use symmetrical circuit configuration for the sides of the first winding and the second winding. FIG. 7 is a schematic circuit diagram of a bidirectional DC-DC converter as the benchmark solution.

1) The Main Circuit Parameter

The main circuit parameters and the semiconductor device used in the power losses calculation are shown in Table I.

TABLE I

|  | Benchmark solution | Solution according to present invention |
|---|---|---|
| Input voltage, [V] | 400 | |
| Output voltage, [V] | 400 | |
| Output current, [A] | 25 | |
| Switching frequency, [Hz] | 100k | |
| Main MOSFET: Q11-Q14, Q21-Q24 | IPW65R041CFD | |
| LLC parameters: Lm | 0.12 mH | |
| LLC parameters: L1, L2 | 7.6 uH | |
| LLC parameters: C1, C2 | 0.33 uF | |
| Rectifier diode | Body diode of IPW65R041CFD | IXYS-DSEP30-06A |
| Auxiliary MOSFET: Qa1, Qb1, Qa2, Qb2 | n.a. | NTMFS4937N, x4 in parallel |

2) The Simulation Model for Power Losses Evaluation

To have a reasonable simulation of the reverse recovery losses of diodes, a PLECS model is established, in which the reverse recovery diode model is employed to simulate the reverse recovery characteristics and losses. For detailed information of the diode model, please refer to "MAST Power Diode and Thyristor Models Including Automatic Parameter Exaction, Alan Courtay, SABER User Group Meeting, Brighton, UK, September 1995". Since the solution according to present invention uses symmetric structure, only the forward power transmission is simulated. The diode parameters are extracted from fast recovery diodes (discrete diode IXYS-DSEP30-06A) and parameters of body diode (Body diode of IPW65R041CFD) respectively.

During simulation, the junction temperature of all the semiconductor devices are adjusted to around 125° C. to have a conservative estimation.

Figure 8:
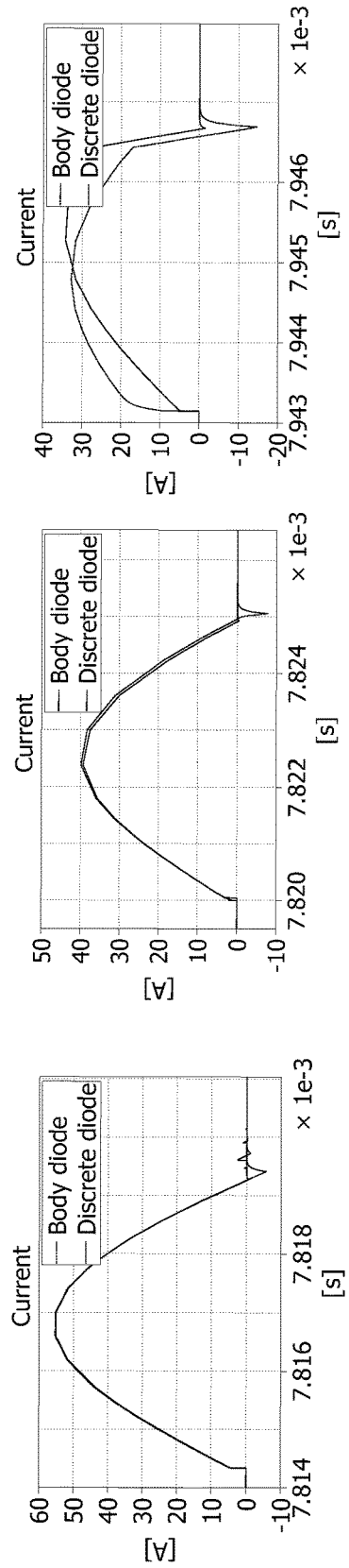
FIG. 8 shows simulation results of the secondary diode current.

The simulation results of the secondary diode current is shown in FIG. 8. It can be observed that at any cases of the switching frequency, the solution according to present invention has lower $I_{rrm}$ and $t_{rr}$, thus less power losses from reverse recovery procedure. In particular, for Buck mode operation, the benefit of the proposed solution is more prominent.

Since the additional auxiliary MOSFET in the proposed solution operates at normal ON or OFF states. The losses from the auxiliary MOSFET are rather low and can be neglected. Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A bidirectional DC-DC converter with intermediate conversion into AC power, including:
   a DC-AC conversion circuit using a plurality of MOSFETs; and
   an AC-DC conversion circuit using a plurality of power diodes;
   a transformer magnetically coupling a first winding and a second winding, wherein the first winding being electrically connected between the DC-AC conversion circuit AC terminals and being electrically connected between the AC-DC conversion circuit AC terminals in an arrangement such that the AC power generated from the intermediate conversion by an operation of the DC-AC conversion circuit is transferred by the transformer in a forward direction from the first winding to the second winding, and the AC-DC conversion circuit converts the AC power transferred in a backward direction from the second winding to the first winding into DC power;

a pair of switches, one of which being inserted in series between DC terminal of the DC-AC conversion circuit and a DC terminal of the AC-DC conversion circuit and the other of which being inserted in series between another DC terminal of the DC-AC conversion circuit and another DC terminal of the AC-DC conversion circuit; and a controller being adapted for turning on the pair of switches such that the plurality of power diodes of the AC-DC conversion circuit are reverse-biased where the AC power is transferred in the forward direction and turning off the pair of switches where the AC power is transferred in the backward direction.

2. The bidirectional DC-DC converter according to claim 1, wherein:
one of the plurality of power diodes of the AC-DC conversion circuit exhibits faster reverse recovery characteristics than a body diode of one of the plurality of MOSFETs of the DC-AC conversion circuit.

3. The bidirectional DC-DC converter according to claim 2, wherein:
one end of the first winding is electrically connected with both of a cathode of the body diode of one of the plurality of MOSFETs of the DC-AC conversion circuit and a cathode of one of the plurality of power diodes of the AC-DC conversion circuit.

4. The bidirectional DC-DC converter according to claim 3, wherein:
another end of the first winding is electrically connected with both of a cathode of a body diode of another of the plurality of MOSFETs of the DC-AC conversion circuit and a cathode of another of the plurality of power diodes of the AC-DC conversion circuit.

5. The bidirectional DC-DC converter according to claim 2, wherein:
the pair of switches includes an auxiliary MOSFET; and
a body diode of the auxiliary MOSFET of the pair of switches is connected in anti-series with the body diode of one of the plurality of MOSFETs of the DC-AC conversion circuit.

6. The bidirectional DC-DC converter according to claim 2, wherein:
the DC-AC conversion circuit is configured of multilevel full bridge topology or multilevel half bridge topology.

7. The bidirectional DC-DC converter according to claim 1, wherein:
one end of the first winding is electrically connected with both of a cathode of a body diode of one of the plurality of MOSFETs of the DC-AC conversion circuit and a cathode of one of the plurality of power diodes of the AC-DC conversion circuit.

8. The bidirectional DC-DC converter according to claim 7, wherein:
another end of the first winding is electrically connected with both of a cathode of a body diode of another of the plurality of MOSFETs of the DC-AC conversion circuit and a cathode of another of the plurality of power diodes of the AC-DC conversion circuit.

9. The bidirectional DC-DC converter according to claim 7, wherein:
the pair of switches includes an auxiliary MOSFET; and
a body diode of the auxiliary MOSFET of the pair of switches is connected in anti-series with the body diode of one of the plurality of MOSFETs of the DC-AC conversion circuit.

10. The bidirectional DC-DC converter according to claim 7, wherein:
the DC-AC conversion circuit is configured of multilevel full bridge topology or multilevel half bridge topology.

11. The bidirectional DC-DC converter according to claim 1, wherein:
the pair of switches includes an auxiliary MOSFET; and
a body diode of the auxiliary MOSFET of the pair of switches is connected in anti-series with a body diode of one of the plurality of MOSFETs of the DC-AC conversion circuit.

12. The bidirectional DC-DC converter according to claim 1, wherein:
the DC-AC conversion circuit is configured of multilevel full bridge topology or multilevel half bridge topology.

13. The bidirectional DC-DC converter according to claim 1, wherein:
the AC-DC conversion circuit is configured of full bridge topology or half bridge topology.

14. The bidirectional DC-DC converter according to claim 1, wherein:
the DC-AC conversion circuit includes:
a first switching leg comprising two of the plurality of MOSFETs connected in series, and
a second switching leg comprising another two of the plurality of MOSFETs connected in series and being connected with the first switching leg in parallel;
both ends of the first switching leg are the DC terminals of the DC-AC conversion circuit; and
a series connection point of the first switching leg and a series connection point of the second switching leg are the AC terminals of the DC-AC conversion circuit.

15. The bidirectional DC-DC converter according to claim 1, wherein:
the AC-DC conversion circuit includes:
a first diode leg comprising two of the power diodes connected in series, and
a second diode leg comprising another two of the power diodes connected in series and being connected with the first diode leg in parallel;
both ends of the first diode leg are the DC terminals of the AC-DC conversion circuit; and
a series connection point of the first diode leg and a series connection point of the second diode leg are the AC terminals of the AC-DC conversion circuit.

16. The bidirectional DC-DC converter according to claim 1, wherein:
the DC-AC conversion circuit includes:
a switching leg comprising two of the plurality of MOSFETs connected in series;
a capacitor leg comprising a pair of capacitors connected in series and being connected with the switching leg in parallel;
wherein:
both ends of the switching leg are the DC terminals of the DC-AC conversion circuit;

a series connection point of the switching leg and a series connection point of the capacitor leg are the AC terminals of the DC-AC conversion circuit.

17. The bidirectional DC-DC converter according to claim 16, wherein:
the AC-DC conversion circuit includes:
a diode leg comprising two of the plurality of power diodes connected in series; and
the capacitor leg being connected with the diode leg in parallel;
wherein:
both ends of the diode leg are the DC terminals of the AC-DC conversion circuit; and
a series connection point of the diode leg and a series connection point of the capacitor leg are the AC terminals of the AC-DC conversion circuit.

18. The bidirectional DC-DC converter circuit according to claim 1, further includes:
a capacitive element or an inductive element to realize soft-switching of the plurality of MOSFETs.

19. A method for controlling a bidirectional DC-DC converter with intermediate conversion into AC power, which includes a DC-AC conversion circuit using a plurality of MOSFETs, an AC-DC conversion circuit using a plurality of power diodes, and a transformer magnetically coupling a first winding and a second winding, wherein the first winding being electrically connected between DC-AC conversion circuit AC terminals and being electrically connected between AC-DC conversion circuit AC terminals in an arrangement such that the AC power generated from the intermediate conversion by an operation of the DC-AC conversion circuit is blocked by the AC-DC conversion circuit but is transferred by the transformer in a forward direction from the first winding to the second winding, and the AC-DC conversion circuit converts the AC power transferred in a backward direction from the second winding to the first winding into DC power, the method including steps of:
where the AC power is transferred in the forward direction:
electrically connecting respective DC terminals of the DC-AC conversion circuit and the AC-DC conversion circuit;
electrically connecting another respective DC terminals of the DC-AC conversion circuit and the AC-DC conversion circuit;
reverse-biasing the plurality of power diodes of the AC-DC conversion circuit; and
supplying the AC power generated from the intermediate conversion by the DC-AC conversion circuit to the first winding of the transformer;
where the AC power is transferred in the backward direction:
supplying the AC power from the intermediate conversion by the first winding of the transformer;
opening the electrical connection of the respective DC terminals of the DC-AC conversion circuit and the AC-DC conversion circuit;
opening the electrical connection of the another respective DC terminals of the DC-AC conversion circuit and the AC-DC conversion circuit;
the AC-DC conversion circuit converting the AC power supplied by the first winding into DC power; and
blocking the AC power flowing through a body diode of the plurality of MOSFETs of the DC-AC conversion circuit by the opened electrical connections.

20. The method according to claim 19, wherein:
one of the plurality of power diodes of the AC-DC conversion circuit exhibits faster reverse recovery characteristics than the body diode of the plurality of MOSFETs of the DC-AC conversion circuit.

* * * * *